(12) United States Patent
Ando

(10) Patent No.: US 6,498,979 B2
(45) Date of Patent: Dec. 24, 2002

(54) ENGINE CONTROL UNIT HAVING CYLINDER DETERMINATION FUNCTION

(75) Inventor: Katsuyuki Ando, Kasugai (JP)

(73) Assignee: Denso Corporation, Aichi-pref. (JP)

( * ) Notice: Subject to any disclaimer, the term of this patent is extended or adjusted under 35 U.S.C. 154(b) by 14 days.

(21) Appl. No.: 09/764,216

(22) Filed: Jan. 19, 2001

(65) Prior Publication Data

US 2001/0011203 A1 Aug. 2, 2001

(30) Foreign Application Priority Data

Jan. 27, 2000 (JP) .......................................... 2000-19303
Nov. 29, 2000 (JP) ........................................ 2000-363045

(51) Int. Cl.$^7$ ............................ G06G 7/70; G06F 19/00

(52) U.S. Cl. .......................... 701/102; 701/114; 73/116

(58) Field of Search ................................. 73/116, 118.1; 123/406.58, 406.62, 487, 612, 613, 617; 701/102, 114, 115

(56) References Cited

U.S. PATENT DOCUMENTS 4,960,092 A * 10/1990 Sasaki et al. ................ 123/414
6,283,105 B1 * 9/2001 Kasai .......................... 123/672
6,302,085 B1 * 10/2001 Sekine et al. ........... 123/406.62

* cited by examiner

*Primary Examiner*—Gene Mancene
*Assistant Examiner*—Johnny H. Hoang
(74) *Attorney, Agent, or Firm*—Nixon & Vanderhye P.C.

(57) ABSTRACT

A crank signal generated by a crank angle sensor has a front pulse missing portion and a back pulse missing portion in a pulse train of every predetermined angle interval. The level of a cam signal generated by a cam angle sensor becomes different in the pulse missing portion of the crank signal. A level different from that in the pulse missing portion continues for a period of predetermined angles before the pulse missing portion. A microcomputer determines each of the front and back pulse missing portions in the crank signal on the basis of the level of the cam signal in the pulse missing portion of the crank signal in two cycles of the rotation of a crankshaft of the engine and the duration of a different level before the pulse missing portion.

23 Claims, 11 Drawing Sheets

ENGINE CONTROL UNIT HAVING CYLINDER DETERMINATION FUNCTION

CROSS REFERENCE TO RELATED APPLICATION

This application is based on and incorporates herein by reference Japanese Patent Applications No. 2000-19303 filed Jan. 27, 2000 and No. 2000-363045 filed Nov. 29, 2000.

BACKGROUND OF THE INVENTION

The present invention relates to an engine control unit, and particularly to an engine control unit which determines cylinders to be controlled of an engine.

An engine control unit (ECU) is an electronic control unit for performing controls such as fuel injection control, ignition timing control, and idle speed control to operate an engine in an optimum state. Specifically, signals from various sensors for sensing engine operating states such as crank angle sensor and engine coolant temperature sensor are supplied to the ECU to control an optimum fuel injection amount, injection timing, ignition timing, and the like.

Controls synchronized with the engine speed such as ignition control and injection control, that is, controls synchronized with a crankshaft rotation position are performed by generating a signal of ignition pulses or the like after elapse of offset (delay) time from a predetermined crankshaft position indicated by the edge of a crank signal. Further, a cylinder to be controlled with respect to fuel injection and ignition must be determined accurately from time to time during engine operation.

It is, however, necessary to perform an arithmetic operation for converting the angle to time. There is a demand for reduction in processing load and improvement in accuracy.

SUMMARY OF THE INVENTION

It is therefore an object of the present invention to provide an engine control unit with reduced processing load and improved accuracy and, moreover, capable of properly controlling the engine even when a cylinder determination signal includes noises.

According to the present invention, a crank signal and a can signal are generated by a crank angle sensor and a cam angle sensor in synchronism with rotation of a crankshaft and a camshaft of an engine, respectively. The crank signal is generated to have a front pulse missing portion and a back pulse missing portion in a pulse train of every predetermined angle interval. The cam signal is generated to have different levels in the pulse missing portions of the crank signal. A level different from that in the pulse missing portion continues for a period of predetermined angles before the pulse missing portion. A microcomputer determines each of the front and back pulse missing portions in the crank signal on the basis of the level of the cam signal in the pulse missing portion of the crank signal in two cycles of the rotation of the crankshaft of the engine and the duration of the different level before the pulse missing portion.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

The present invention will be described in detail with reference to an embodiment, in which an engine control unit (ECU) is applied to a five-cylinder four-cycle engine.

Figure 1:
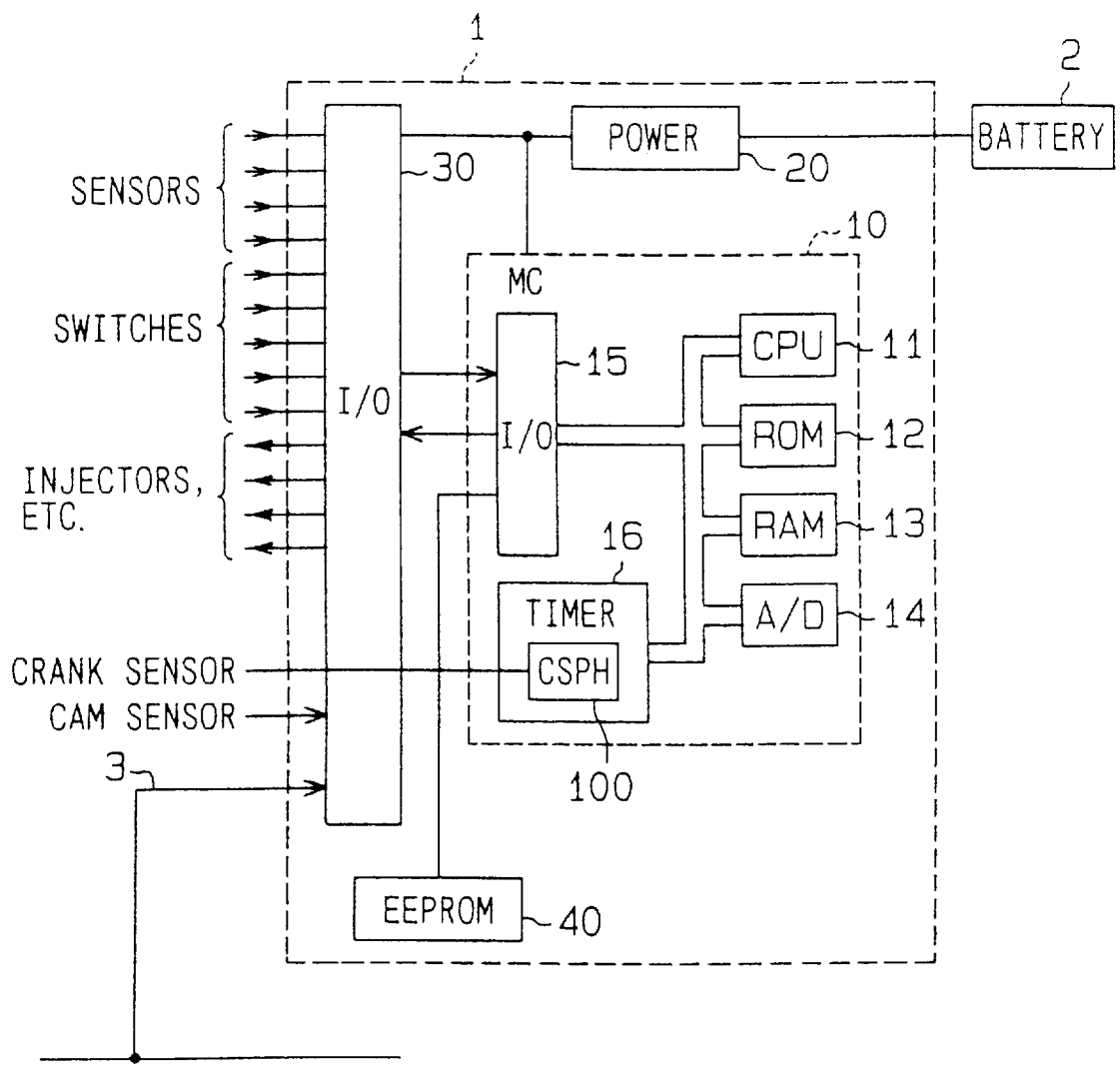
FIG. 1 is a block diagram showing an engine control unit according to an embodiment of the present invention.

Referring to FIG. 1, an engine control unit (ECU) 1 has a microcomputer (MC) 10, a power supply circuit 20, an input/output circuit (I/O) 30, and an EEPROM 40. The power supply circuit 20 receives a supply of power from a battery 2 and supplies a predetermined voltage to various electronic circuit devices in the ECU 1. The microcomputer 10 has a CPU 11, a ROM 12, a RAM 13, an A/D converter 14, an input/output interface 15, and a timer module 16. The circuit devices transmit/receive data to/from each other via a data bus. The EEPROM 40 is connected to the input/output interface 15, and the circuit devices transmit/receive data to/from the EEPROM 40 via the input/output interface 15.

The input/output circuit 30 receives signals from sensors, switches, and the like, and outputs drive signals to an injector (fuel injection valve) and an igniter. Further, a communication line 3 is connected to the input/output circuit 30 and data is transmitted/received to/from other ECU (not shown) via the input/output circuit 30. The CPU 11 in the microcomputer 10 receives signals (data) from the sensors, switches, and the like and data from the communication line 3 via the input/output circuit 30 and the input/output interface 15 and executes various arithmetic operations on the basis of the data to control the injector and the like via the input/output interface 15 and the input/output circuit 30.

Figure 2:
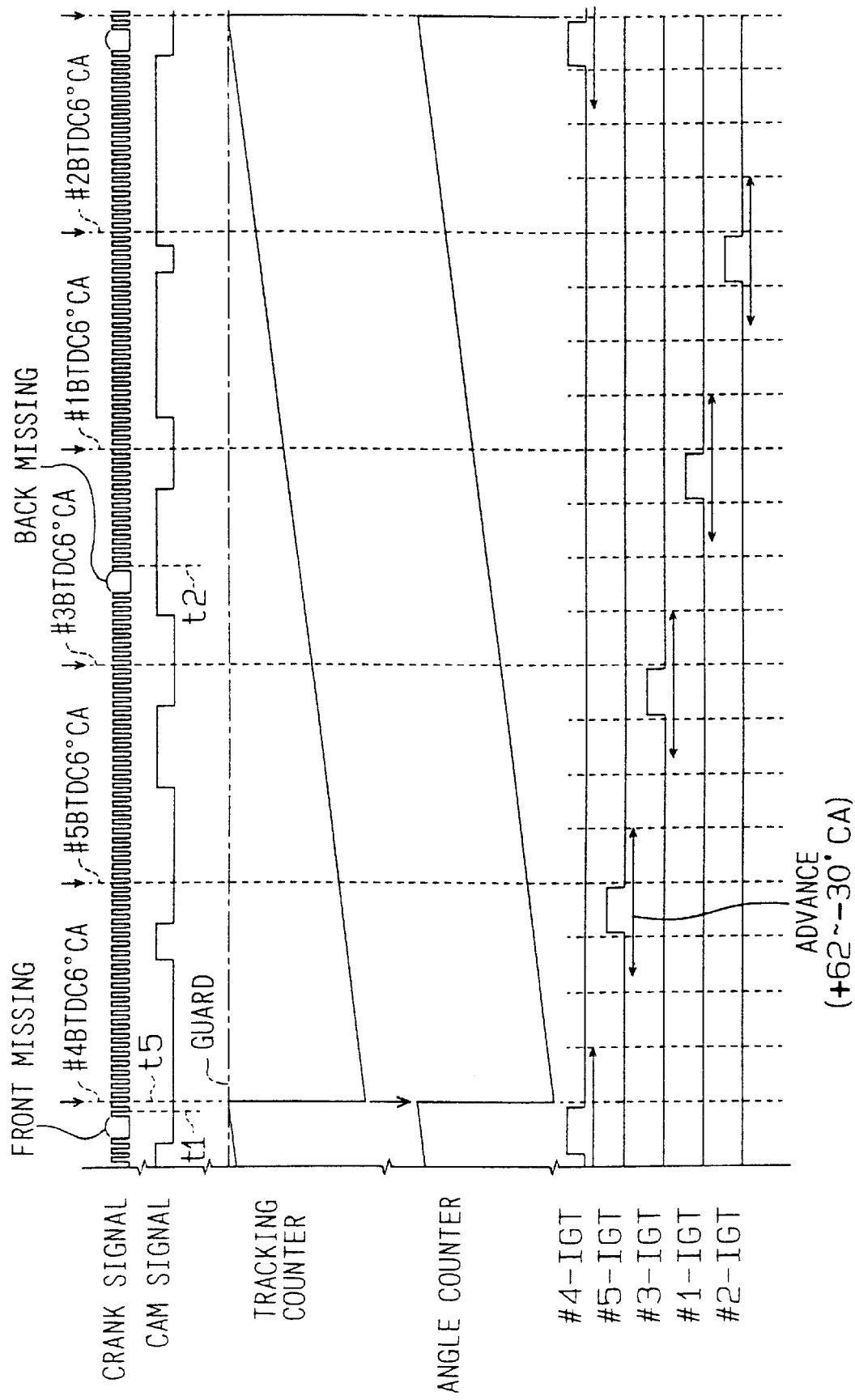
FIG. 2 is a time chart showing various signals generated in one cycle (720° CA) of an engine in the embodiment.

The signals received by the ECU 1 include a crank signal from a crank angle sensor (crank signal generating means) and a cam signal from a cam angle sensor (cylinder determination signal generating means). FIG. 2 shows the crank and cam signals of one cycle (720° crank angle) of the engine.

The crank signal generated by the crank angle sensor is a pulse train of every predetermined angle interval corresponding to rotation of the crankshaft of the four-cycle engine. The crank signal has a pulse missing portion (reference position in rotation of the crankshaft) in which pulses are missing in the pulse train to indicate a reference position of the crankshaft based on which delay angles of starting fuel injection and ignition are measured. The crank signal in the embodiment has a structure that two pulses are skipped every 60 pulses (60-2 pulse structure). Specifically, the pulse interval in the pulse train is 6° CA, and the pulse missing portion is provided every 360° CA in the pulse train. One (pulse missing portion of every 720° CA) of the pulse missing portions is defined as a front pulse missing portion and the other one (pulse missing portion of every 720° CA subsequent to the first one) is defined as a back pulse missing portion.

The cam signal generated by the cam angle sensor is synchronized with the rotation of the camshaft of the engine and is a cylinder determination signal for specifying the cylinder position. The trailing edge of the cam signal is provided every 144° CA. At the trailing edge (timing t1) immediately after the front pulse missing portion of the crank signal, the cam signal is at the low (L) level. At the trailing edge (timing t2) immediately after the back pulse missing portion of the crank signal, the cam signal is at the high (H) level. That is, when the cam signal level is the L level in the pulse missing portion, the pulse missing portion can be determined as a front pulse missing portion. When the cam signal level is the H level in the pulse missing portion, the pulse missing portion can be determined as a back pulse missing portion.

The crank signal is supplied to a crank signal processing hardware (CSPH) 100 in the timer module 16 in FIG. 1. The cam signal is received by the microcomputer 10 via the input/output circuit 30. The crank signal processing hardware 100 provided in the timer module 16 is a functional unit for processing the crank signal in a hardware manner. A process on the crank signal (generation of angle signals by dividing crank edge interval) of FIG. 2 can be performed by the crank signal processing hardware 100 in a hardware manner.

Figure 3:
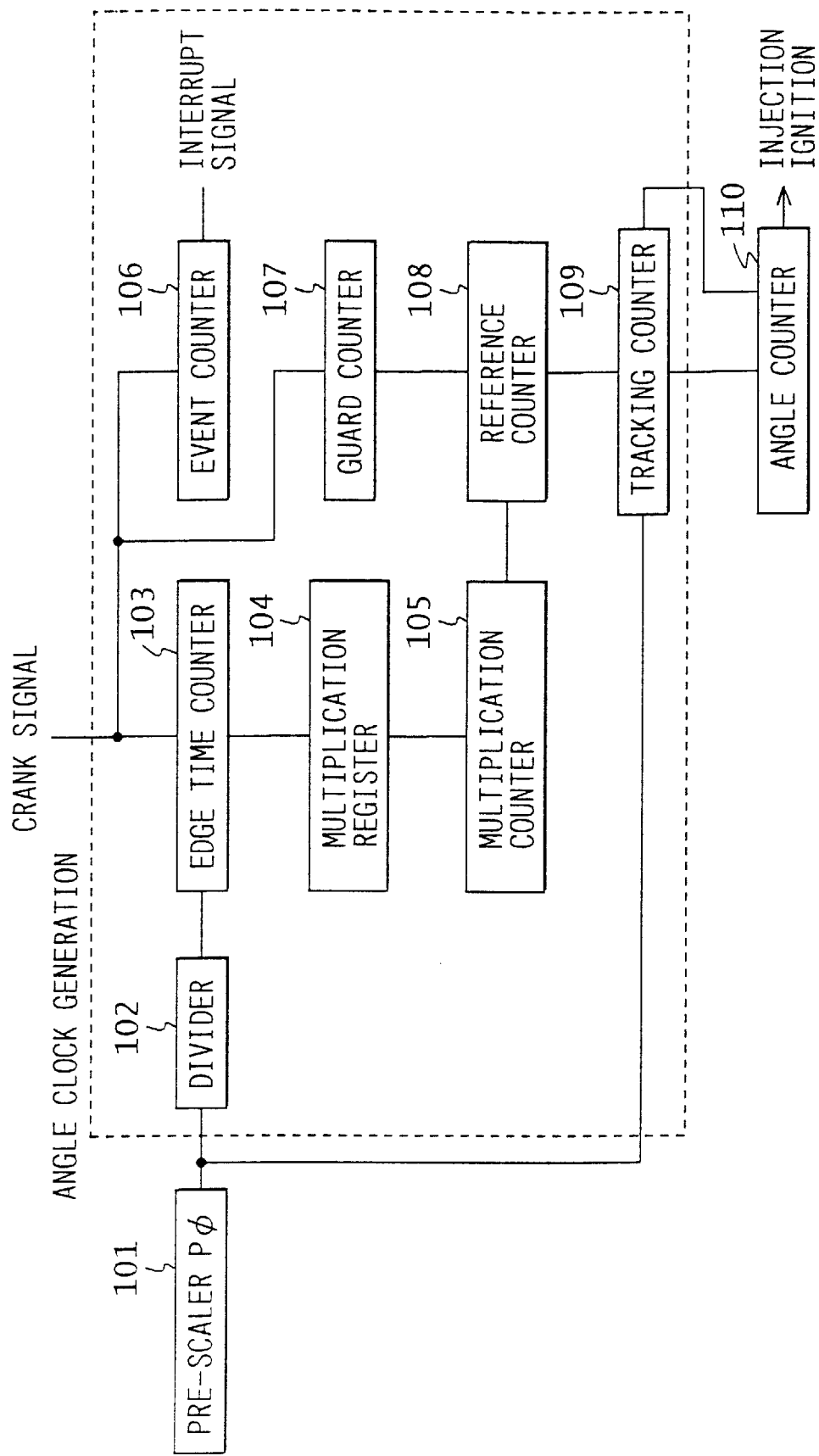
FIG. 3 is a block diagram of a crank signal processing hardware in the embodiment.

As shown in FIG. 3, the crank signal processing hardware 100 has a pre-scaler 101, a frequency divider 102, an edge time measuring counter 103, a frequency multiplication register (edge time storing register) 104, a frequency multiplication counter 105, an event counter 106, a guard counter 107, a reference counter 108, a tracking counter (angle counter) 109, and an angle clock counter 110 for generating injection signals and ignition signals. A signal P φ from the pre-scaler 101 is sent to the edge time measuring counter 103 via the frequency divider 102. The signal P φ is also sent to the tracking counter (angle counter) 109. Further, the crank signal is sent to the edge time measuring counter 103, event counter 106, and guard counter 107.

Figure 4:
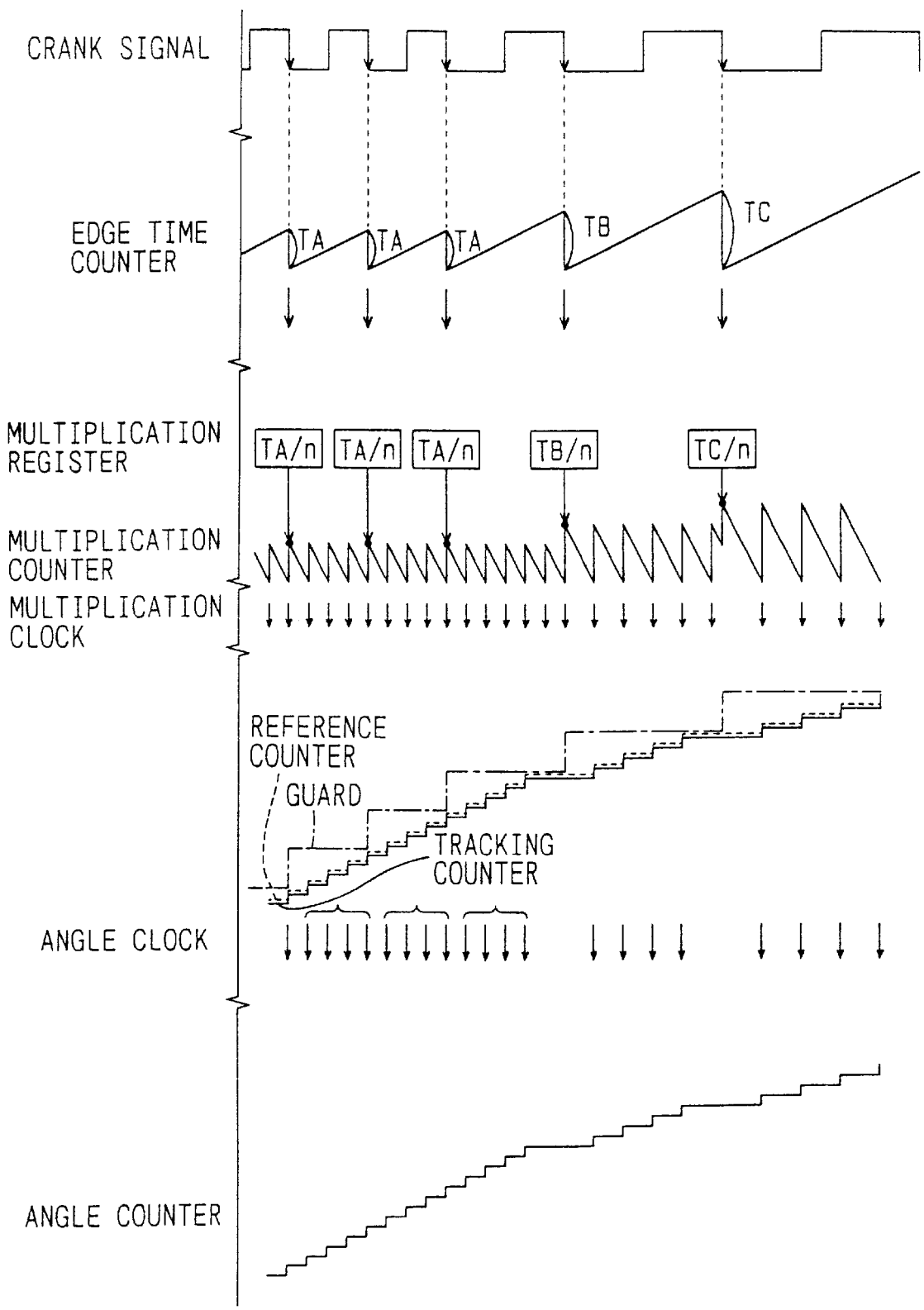
FIG. 4 is a time chart showing various signals generated in the crank signal processing hardware.

FIG. 4 is a time chart showing generation of angle clocks (angle signals). Shown in FIG. 4 are the input crank signal, the count value of the edge time measuring counter 103, a storage value of the frequency multiplication register 104, a count value of the frequency multiplication counter 105, an output signal (frequency multiplication clock) of the multiplication counter 105, a guard value which is (n) times as large as the value of the guard counter 107, a count value of the reference counter 108, a count value of the tracking counter 109, and a count value of the angle counter 110.

The edge time measuring counter 103 in FIG. 3 receives the crank signal and measures the time between crank edges (pulse interval). More specifically, the edge time measuring counter 103 as pulse interval measuring means is a counter which is incremented by time synchronization as shown in FIG. 4 and measures time between crank edges (between trailing edges of the crank signal). The measured value is multiplied by 1/n times and resultant data is transferred to the frequency multiplication register 104 at the time of input of the crank edge. The transferred data serves as an initial value of the frequency multiplication counter 105 as a down-counter. An example of the frequency multiplication value (n) is "32".

The frequency multiplication counter 105 in FIG. 3 generates frequency multiplication clocks by multiplying the crank edge interval measured by the edge time measuring counter 103 by 1/n. Specifically, the frequency multiplication counter 105 counts down by time synchronization as shown in FIG. 4. When underflow occurs, it generates a frequency multiplication clock, and the count value is reset to the initial value. This operation is repeated. When the next crank edge (trailing edge of the crank signal) is supplied, the value of the frequency multiplication register 104 and the initial value of the frequency multiplication counter 105 are updated to the latest values. The frequency multiplication counter 105 as frequency multiplication signal generating means generates the frequency multiplication signals (frequency multiplication clocks) of integer times by the next pulse on the basis of the pulse interval of this time measured by the edge time measuring counter 103.

The reference counter 108 in FIG. 3 is incremented by the frequency multiplication clock as shown by dotted lines in FIG. 4. The tracking counter 109 in FIG. 3 is incremented by a time synchronization clock (performs a counting operation by the internal clock). The guard counter 107 is a counter for receiving the crank signal and is incremented by the trailing edge of the crank signal. On receipt of a crank edge, a value which is (n) times (frequency multiplication) as large as a value before the increment is transferred to the reference counter 108.

As shown in FIG. 4, the count value of the reference counter 108 cannot exceed the guard value (value of (n) times as large as the count value) transferred from the guard counter 107 when the crank edge is supplied. The guard value is shown by a dotted-chain line in FIG. 4. The tracking counter 109 is incremented only when its value is smaller than the count value of the reference counter 108. Synchronously with the increment of the tracking counter 109, an angle clock (angle signal) is generated. In such a manner, the angle clock is generated by the three counters 107, 108, and 109.

In this embodiment, an internal clock (signal P φ from the pre-scaler) is set at 20 MHz, and the tracking counter 109 can operate at higher speed as compared with the other counters.

In FIG. 4, at the time of engine deceleration in which the crank edge interval increases with time, in the counting operations of the reference counter 108 and the tracking counter 109, the value of the reference counter 108 reaches the guard value which is (n) times as large as the value of the guard counter 107 before the crank edge is supplied, so that the increment of the tracking counter 109 is inhibited. The incrementing operation of the reference counter 108 and the tracking counter 109 is stopped at a frequency multiplication value by the guard counter 107. As a result, at the time of engine deceleration, the incrementing operation of the tracking counter 109 is stopped to prevent generation of angle clocks of a predetermined number or larger.

The angle counter 110 for ignition and injection in FIG. 3 is incremented as shown in FIG. 4, each time the angle clock from the tracking counter 109 is received. The ignition and injection controls are performed synchronously with the crank angles by using a comparison register on the basis of the count value of the angle counter 110 for ignition and injection. That is, the controls on ignition, injection, and the like are performed synchronously with the crank angle by the angle counter 110 for ignition and injection in a hardware manner. By realizing a system which generates frequency multiplication signals (frequency multiplication clocks) at predetermined angle intervals to synchronize with the engine speed, an arithmetic operation for converting from angle to time is made unnecessary. The reduction in processing load and improvement in accuracy (when n=32, LSB=0.1875° CA) can be achieved.

When the crank edge is supplied, the value of (n) times (frequency multiplication) as large as the signal of the guard counter 107 is transferred (loaded) to the reference counter 108. In order to realize a counter of 720° CA per cycle, the guard counter 107 is reset to "0" at the crank edge immediately preceding the crank edge at which the reference counter 108 is desired to be reset.

The event counter 106 in FIG. 3 increments at the trailing edges of pulses of the crank signal and outputs an angle cycle interrupt signal at each edge. The CPU 11 detects the pulse missing position in the crank signal from the count value (the number of edge inputs) of the event counter 106. The count value of the event counter 106 is initialized every engine cycle (720° CA).

In this embodiment, the, frequency multiplication register 104, frequency multiplication counter 105, guard counter 107, reference counter 108, and tracking counter 109 in FIG. 3 form frequency multiplication signal generating means. The frequency multiplication signal (frequency multiplication clock) is generated and the angle clock for engine control is outputted by the frequency multiplication signal generating means. The frequency multiplication signal generating means has the counter 109 for generating a clock signal which is subjected to a counting operation on the basis of the frequency multiplication signal (frequency multiplication clock).

Figure 5:
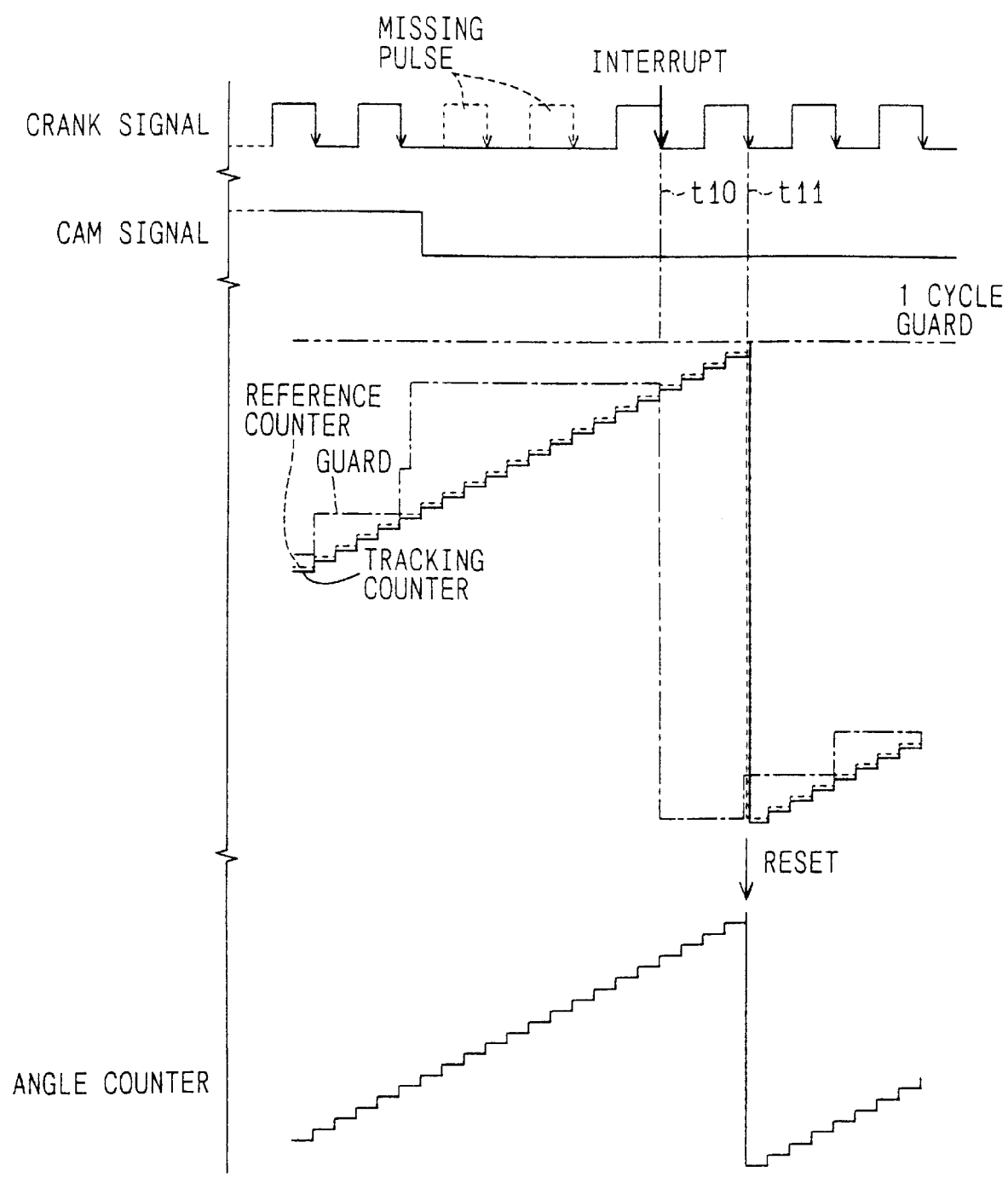
FIG. 5 is a time chart showing various signals generated for resetting an angle counter at the time of a front pulse missing portion.

The operation of the ECU 1 operates as follows. FIG. 5 is a time chart in the front pulse missing position of the crank signal.

First, when the front pulse missing position is determined since the level of the cam signal is the L level at the trailing edge (crank edge) of the pulse immediately after the pulse missing portion at timing t10, the CPU 11 resets the guard counter 107 to "0". The reference counter 108 loads the value "0" of the guard counter 107 at the following crank edge (at timing t11 in FIG. 5) at which the system is reset. When the count value of the tracking counter 109 reaches a guard value of one cycle in such a state (timing t5 in FIG. 2), the tracking counter 109 is reset to "0" in a hardware manner. When the tracking counter 109 is reset to "0", a reset signal is sent to the angle counter 110 for ignition and injection.

The front and back pulse missing portions of the crank signal are determined by using the level of the cam signal in a software manner at the rising edges (timings t1 and t2) immediately after the pulse missing portions of the crank signal. When the cam signal level is "L" and the front pulse missing portion is determined, the tracking counter 109 is reset in a hardware manner at the position (timing t5) of BTDC of 6° CA of the fourth cylinder as the system initial position, and the angle counter 110 for ignition and injection is simultaneously initialized upon transmission of the reset signal. When noise occurs in the cam signal and the level of the cam signal in the front pulse missing position becomes high, the position is erroneously determined as the back pulse missing position, and the counter cannot be initialized.

Figure 10:
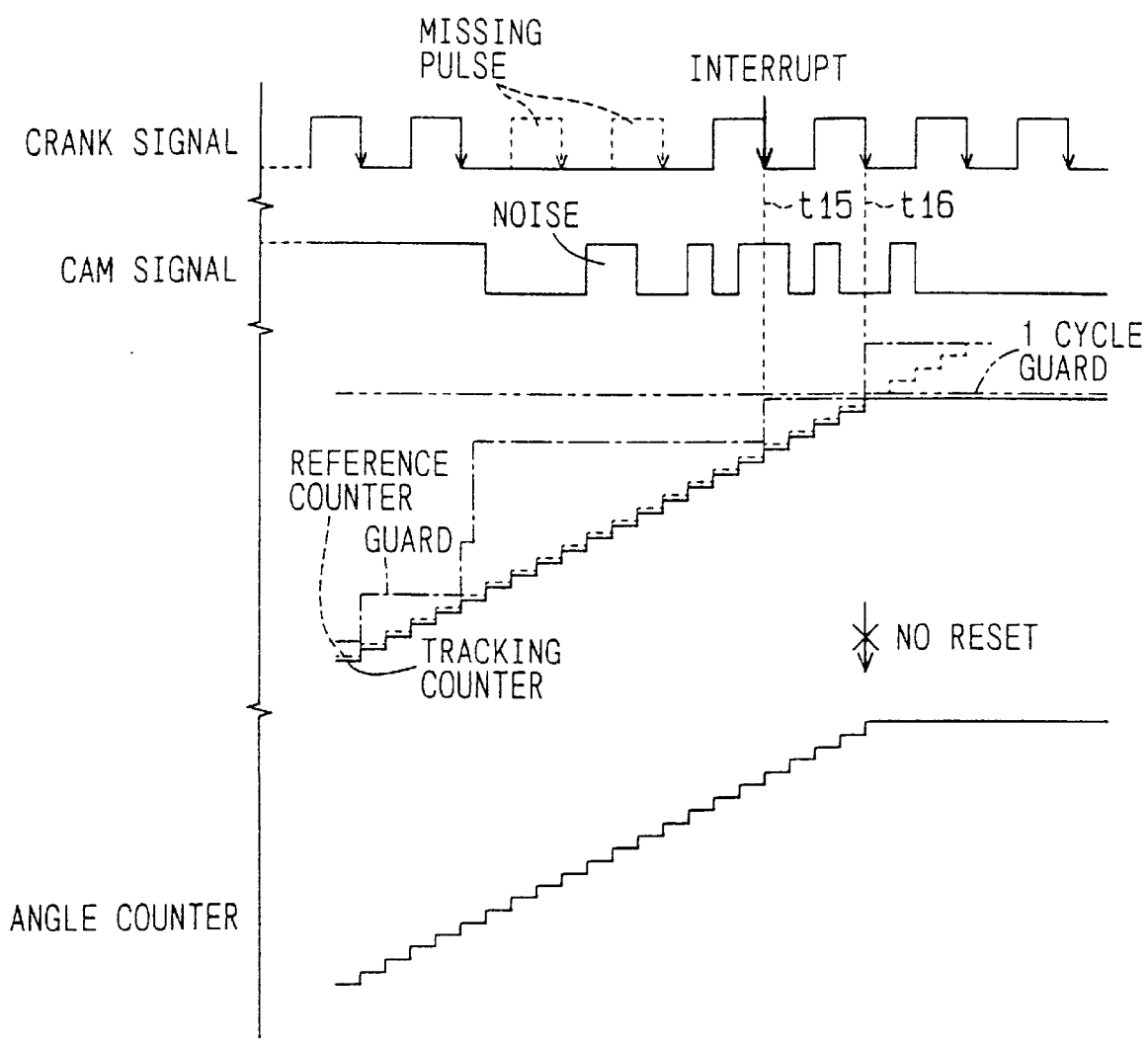
FIG. 10 is a time chart showing an angle counter process when noise occurs in the cam signal and erroneous determination is made.
Figure 11:
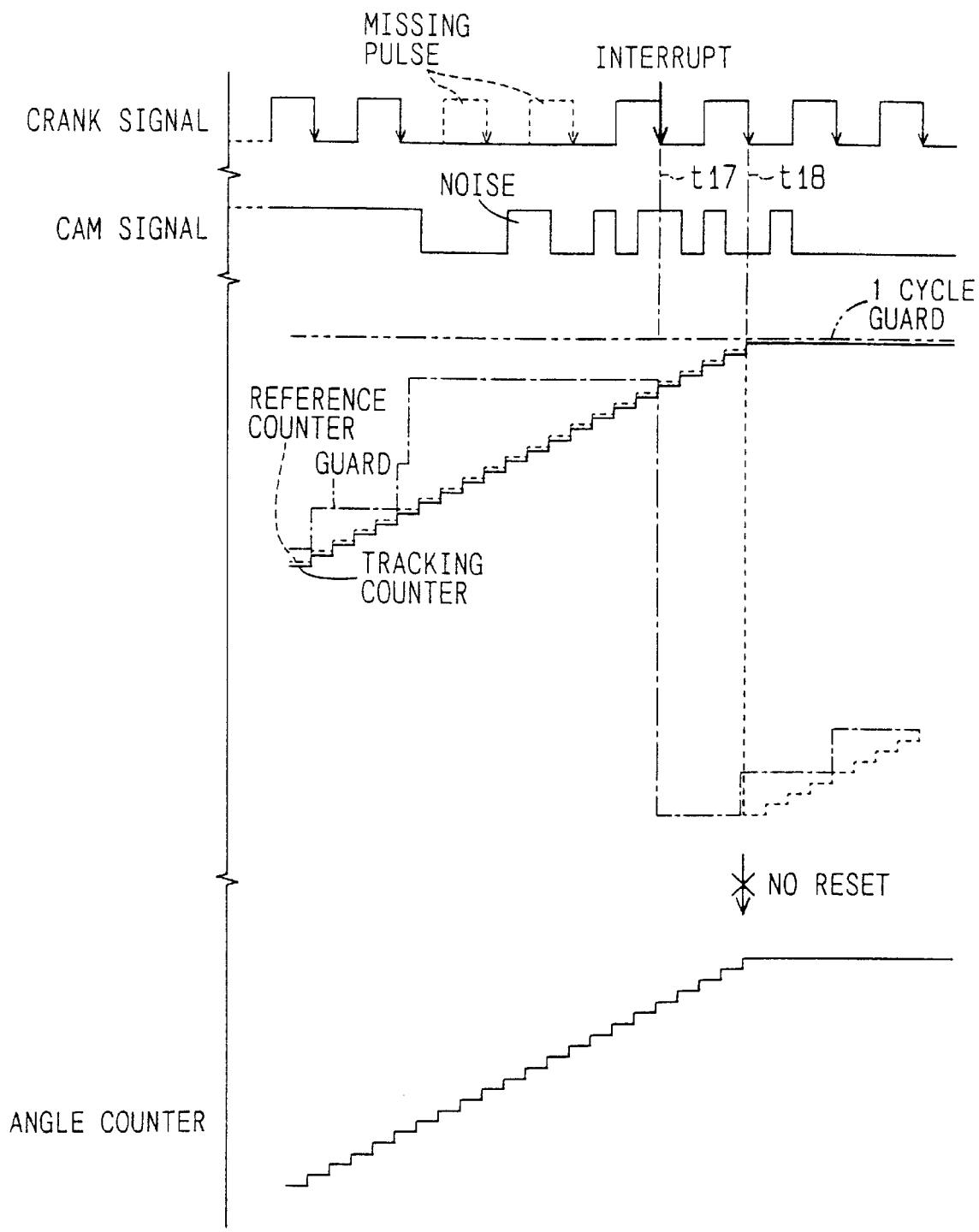
FIG. 11 is a time chart showing the angle counter process when noise occurs in the cam signal and erroneous determination is made.

FIGS. 10 and 11 are time charts showing the case where the front/back pulse missing portion is erroneously determined.

In FIG. 10, when noise occurs in the cam signal and the phase of the cam signal becomes at the H level at the cylinder determination position of the inherent front pulse missing portion (timing t15 in FIG. 10), the back pulse missing portion is determined. Consequently, the guard counter 107 is not reset to "0". Since the guard counter 107 is not reset to "0", the reference counter 108 is not reset to "0" either at timing t16 but continues incrementing. Although the tracking counter 109 reaches the guard value of one cycle, the reference counter 108 is not "0", so that the guard value is maintained.

Consequently, generation of the angle clock is stopped, and a reset signal to the angle counter 110 for ignition and injection is not generated. Since the generation of the angle clock is stopped and no reset signal is generated, the angle counter 110 for ignition and injection also maintains at the value same as the guard value of one cycle. Since the angle counter 110 for ignition and injection is maintained at the guard value, coincidence of angle values does not occur and ignition and injection outputs are stopped. As the guard counter 107 is reset to "0" when the next front pulse missing portion is detected, the ignition and injection are not performed through 720° CA. That is, since the value of the angle counter 110 maintains at the guard value, the ignition and injection are stopped for the period of 720° CA.

In the case of setting the value of the back pulse missing position by the detection of the back pulse missing portion as shown in FIG. 11, when the front pulse missing portion is erroneously determined as the back pulse missing portion at time t17 in FIG. 11, the guard counter 107 is not set to "0" but to an intermediate value (value corresponding to 360° CA). The reference counter 108 is not set to "0" and the tracking counter 109 is not reset. Consequently, the ignition and injection are not similarly performed through 720° CA.

In the system using the crank signal having two missing pulse portions during 720° CA as described above, as shown in time chart of FIG. 5, during one cycle of 720° CA, there is only one position where the tracking counter (angle frequency multiplication counter) 109 for frequency multiplying the crank signal supplied and the angle counter 110 for ignition and injection which increments by the angle clock generated by the increment of the counter 109 are initialized. In order to determine the initialization position, the front and back pulse missing portions are discriminated by using the level of the cam signal (cylinder determination signal) and the counters are initialized at the front pulse missing portion.

However, for example, when noise occurs in the cam signal and the phases at the time of determining the front and back pulse missing portions are inverted, inherently, the front pulse missing portion is erroneously determined as the back pulse missing portion. When the erroneous determination is made, the angle clock is not reset, the value of the tracking counter 109 is maintained at the upper limit value of 720° CA of a cycle during 720° CA until the next front pulse missing portion, and the ignition and injection are not performed throughout the period.

In this embodiment, the above erroneous cylinder determination by the front/back pulse missing portions is prevented even if noise occurs in the cam signal as follows. This is based on the fact that the cam signal is the cylinder determination signal and the high and low levels just before the missing pulse portion (to be specific, before predetermined angles) are unconditionally determined, the cylinder discrimination by the front/back pulse missing portions is performed only when both the level of the cam signal at the pulse missing portion and the waveform of the cam signal just before the missing pulse portion satisfy the front/back pulse missing portion conditions.

When they do not satisfy the conditions due to noise or the like, the process is continued by using the determination result of last time. Specifically, the immediately preceding front/back pulse missing portion determination result is forcedly inverted and the cylinder determination is carried out by using the inverted result.

Figure 6:
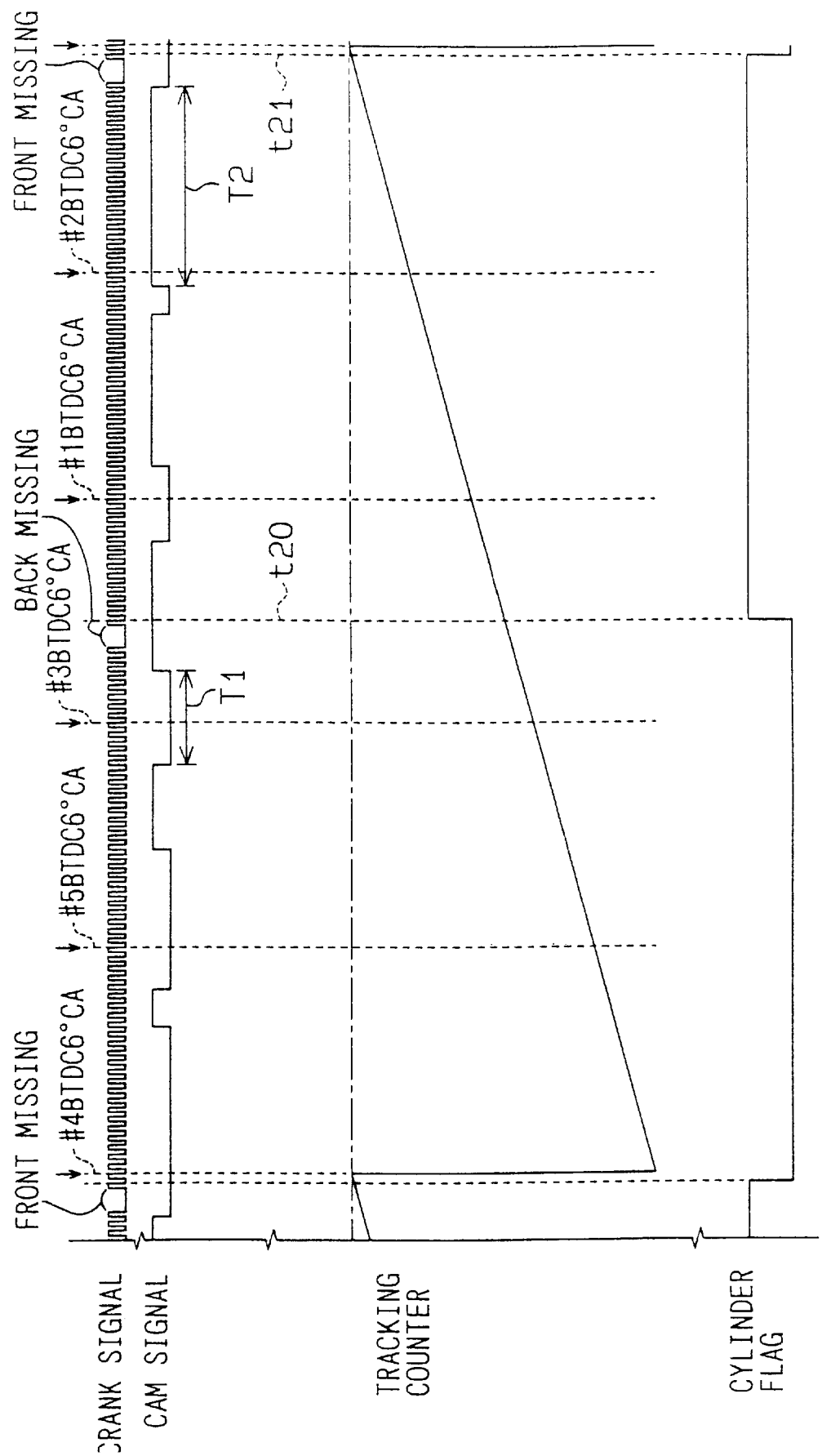
FIG. 6 is a time chart showing a relation among a crank signal, a cam signal and a cylinder determination signal.

In FIG. 6, the waveforms of the crank signal and the cam signal and the cylinder determining method will be described. The pulse edge immediately after the back pulse missing portion is shown by t20, and the pulse edge immediately after the front pulse missing portion is indicated by t21. As shown by T1 and T2 in the figure, only the period T2 in which the cam signal is at the H level just before the front pulse missing portion is extremely long, and the number of crank edges (the number of pulses) during the H level is "21". The number of crank edges (the number of pulses) during the period T1 of the L level of the cam signal just before the back pulse missing portion is "10".

Since the number of crank edges during the cam signal is high just before the pulse missing portion and that after the pulse missing portion are always equal to the above-described values, only when both the level of the cam signal in the pulse missing portion and the number of crank edges during the cam signal is high/low just before the pulse missing portion are satisfied, the cylinder determination is performed. Consequently, the cylinder determination can be accurately performed without making erroneous determination, so that the ignition and injection are prevented from being skipped.

In this embodiment, the margin of the number of crank edges in each of the periods T1 and T2 is set as ±2. When the number of crank edges in the period T1 is within the range of 10±2 (that is, 8 to 12), it is regarded as normal. When the number of crank edges in the period T2 is 19 or more, it is regarded as normal. The number of crank edges (number of pulses) can be detected by the CPU 11 by monitoring the count value of the event counter 106 in FIG. 3.

Figure 7:
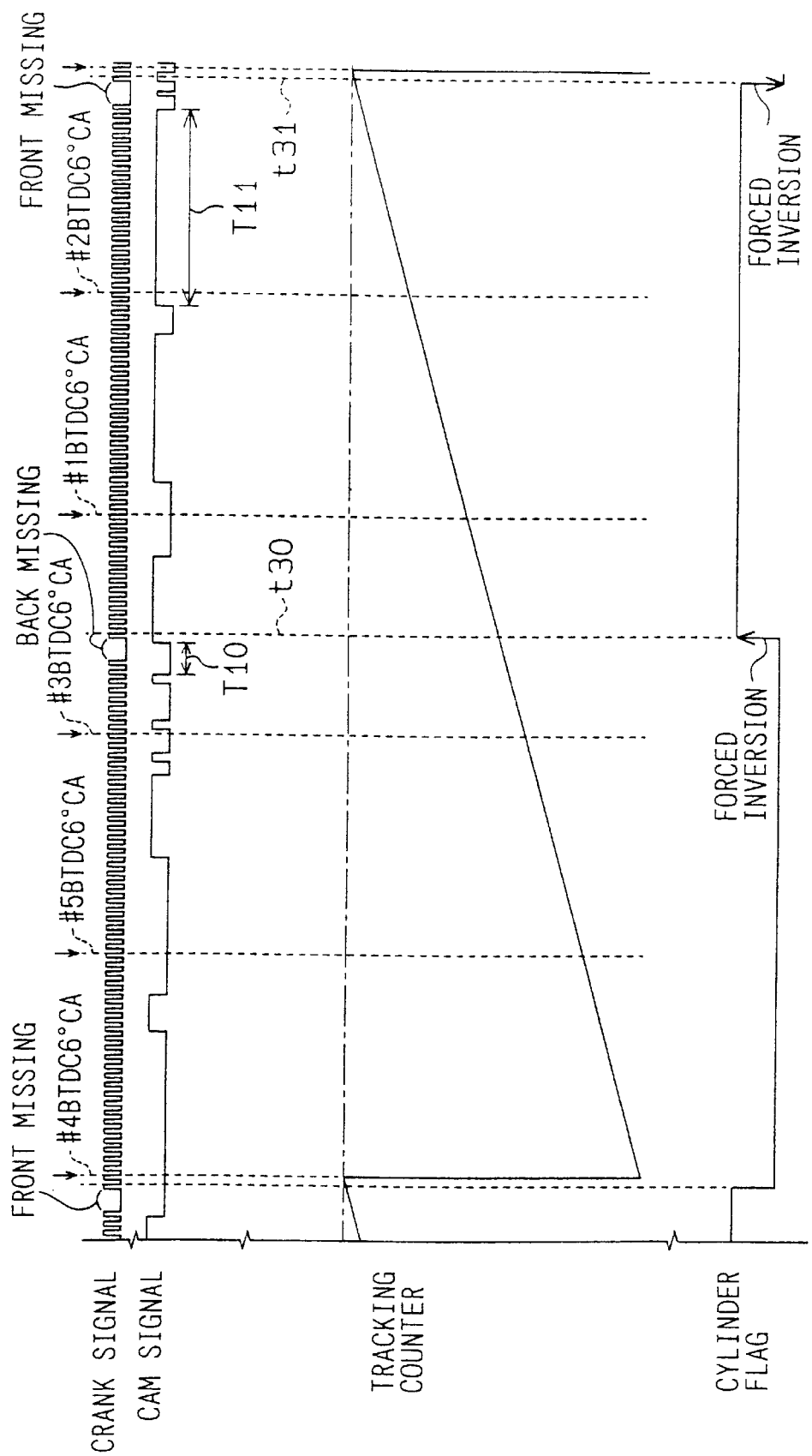
FIG. 7 is a time chart showing a cylinder determining method when noise occurs in the cam signal.

FIG. 7 shows a processing method in the case where noise occurs in the cam signal. When noise occurs in the cam signal, the cam signal is at the H level at the trailing edges (t30, t31) immediately after the pulse missing portion of the crank signal and the number of crank edges during each of the periods T10 and T11 (in which the cam signal is at the L level) does not lie within the range (10±2) of the back pulse missing portion. Consequently, the cylinder determination is not performed.

Specifically, when the "H" level is detected at t30, since the number of crank edges is not within the inherent range of 10±2 in the period T10 in which the cam signal level is L just before the pulse missing portion, the back pulse missing portion condition is not satisfied. When the H level is determined at t31, the number of crank edges is not within the range of 10±2 in the period T11 in which the cam signal level just before the pulse missing portion is H, so that the back pulse missing portion condition is not satisfied. When both of the cylinder determination conditions of the front and back pulse missing portions are not satisfied, the cylinder determination result in the immediately preceding pulse missing position is inverted, and the cylinder determination of this time is performed on the basis of the signal of last time. Consequently, the ignition and injection can be prevented from being skipped due to the cylinder erroneous determination, and the control can be normally continued.

Figure 8:
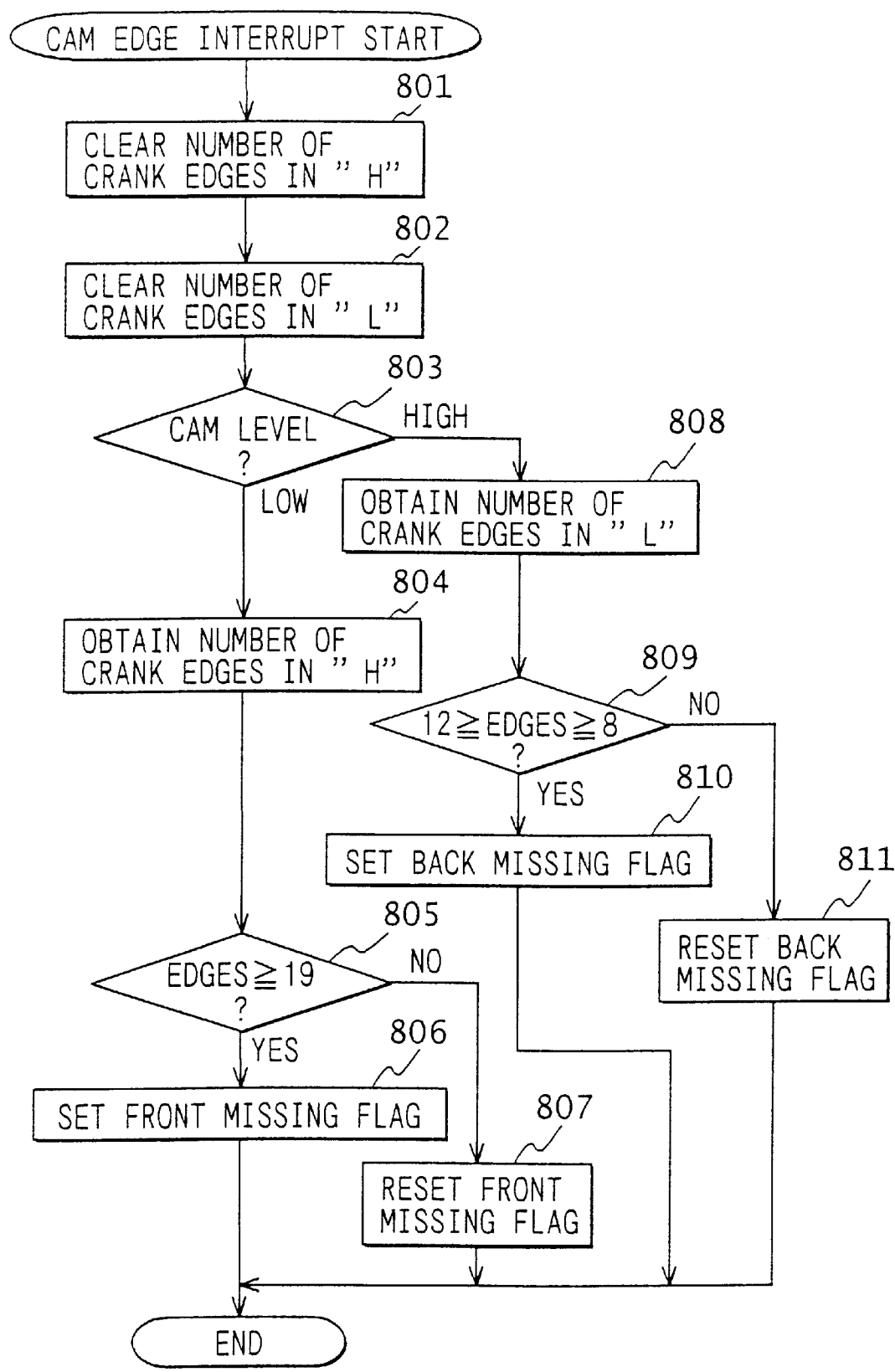
FIG. 8 is a flowchart showing a process of determining front/back pulse missing portions from cam signal waveforms by cam signal interrupt routine.
Figure 9:
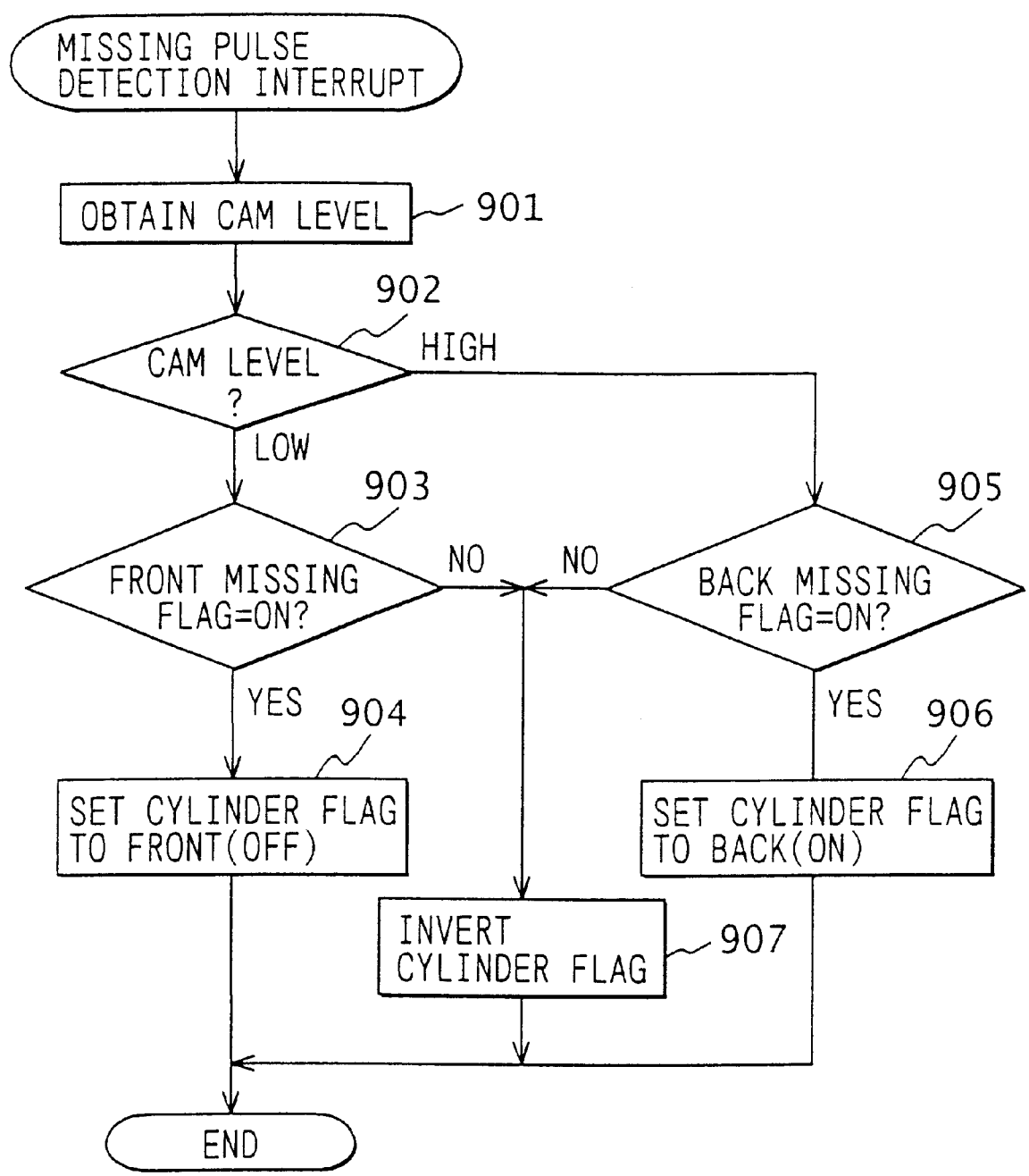
FIG. 9 is a flowchart showing a cylinder determining process by missing pulse detection interrupt routine.

This operation is attained by the CPU 11 which executes the routines shown in FIGS. 8 and 9. FIG. 8 is a flowchart of determining the front/back pulse missing portions by using the waveforms of the cam signal at the edge interruption of the cam signal.

First, at step 801, the CPU 11 clears the number of crank edges stored during the H level of the cam signal. At step 802, the CPU 11 clears the number of crank edges stored during the L level of the cam signal to prevent erroneous determination. At step 803, the CPU 11 determines the level of the current cam signal. In the case of the L level, whether it is just before the front pulse missing portion or not is determined. When the cam signal is at the L level, at step 804, the CPU 11 obtains the number of crank edges during the cam signal is at the H level. The number of crank edges is obtained by monitoring the count value of the event counter 106 in FIG. 3.

Further, at step 805, the CPU 11 determines whether the number of crank edges during the cam signal is at the H level is equal to or larger than the determination value (for instance, 19). Specifically, whether the number of crank edges is "19" or larger is determined. When the number of crank edges is equal to or larger than the determination value, the CPU 11 determines that it is just before the front pulse missing portion, and sets the front pulse missing portion determination flag at step 806. When NO at step 805, it is not just before the front pulse missing portion. Thus, the CPU 11 clears the front pulse missing portion determination flag at step 807.

On the other hand, when the cam signal is at the H level at step 803, whether it is just before the back pulse missing portion or not is determined. When the cam signal is at the H level, the CPU 11 obtains the number of crank edges during the cam signal is at the L level at step 808. At step 809, whether or not the number of crank edges is between the first and second determination values (for instance, between 8 and 12) is determined. Specifically, whether the number of crank edges lies in the range from 8 to 12. The CPU 11 determines it is just before the back pulse missing portion when the number of crank edges lies in the range between the first and second determination values at step 809 and sets a back pulse missing portion determination flag at step 810. When the number of crank edges is out of the range at step 809, it is not in the back pulse missing portion. Consequently, the CPU 11 clears the back pulse missing portion determination flag at step 811.

FIG. 9 is a flowchart of the cylinder determination process in a missing pulse detection interrupt routine. First, the CPU 11 obtains the level of the current cam signal at step 901. At step 902, the CPU 11 determines the level of the cam signal (whether L level or H level). When the cam signal is at the L level, the CPU 11 advances its processing to step 903. When the front missing pulse portion determination flag determined by the cam signal interruption in FIG. 8 is set, it is decided that the front missing pulse portion is detected. At step 904, the cylinder determination flag is cleared (off).

On the other hand, when the cam signal is at the H level at step 902, the CPU 11 advances its processing to step 905. When the back missing pulse portion determination flag determined by the cam signal interruption in FIG. 8 is set, it is decided that the back missing pulse portion is detected, and the cylinder determination flag is set (on) at step 906. When the conditions are not satisfied (out of the range) at steps 903 and 905, the CPU 11 determines that the cylinder determination is not made due to noise or the like, and the cylinder determination flag is inverted at step 907. That is, the result of the cylinder determination at the time of the immediately preceding missing pulse detection is inverted, and the inverted one is used as the result of the cylinder determination of this time.

As described above, in the system which outputs a signal in a hardware manner when the angle timer (angle counter 109) and the ignition and injection timings and the like coincide with each other and which determines the front and back missing pulse portions in two positions during 720° CA by the cam signal (cylinder determination signal), not only the front/rear missing pulse portions but also waveforms of the cam signal are determined. Consequently, while preventing erroneous cylinder determination, even when noise occurs in the cam signal and the cylinder determination cannot be made, the cylinder determination can be continuously made by using the signal of last time. The ignition and injection are therefore prevented from being skipped due to the erroneous cylinder determination operation. Thus, the front/back cylinder determination resistive to noise can be realized.

The above embodiment has the following features.

(A) The CPU 11 as determining means determines the front pulse missing portion and the back pulse missing portion of the crank signal on the basis of the level of the cam signal in the pulse missing portion in the crank signal and the duration of the preceding different level.

Consequently, at the time of determining the two crank angle reference positions in 720° CA by the cylinder determination signal synchronized with the rotation of the camshaft and the crank signal having two pulse missing portions during 720° CA, even if noise occurs in the cylinder determination signal, the cylinder determination can be accurately performed. That is, by determining the front/back reference positions in consideration of the waveform of the cylinder determination signal, erroneous determination is prevented and cylinder determination can be accurately made. As a result, in the system of generating frequency multiplication signals at predetermined angle intervals to synchronize with the engine speed, even when noise occurs in the cam signal, the engine can be properly controlled. The engine control unit highly resistive to noise can be therefore achieved.

(B) More specifically, the tracking counter 109 increments on the basis of the frequency multiplication clocks to generate angle clocks. The CPU 11 sets "0" in the guard counter 107 in accordance with the determination result, thereby initializing the tracking counter 109. Consequently, the cylinder determination can be accurately made and the counter 109 can be correctly initialized, so that the angle clocks for engine control can be outputted with reliability.

(C) The crank signal processing hardware 100 and the CPU 11 operates as determining means and count means to execute count operation based on the crank signal. The front pulse missing portion and the back pulse mission portion in the crank signal are determined based on the level of the cam signal in the pulse missing portions of the crank signal and the period of continuation of the different level before the pulse missing portion. The count value is reset based on the determination result, and the engine is controlled based on the count value. Thus, the same advantage (A) is attained.

(D) When the front and back pulse missing portions cannot be determined by using the levels of the cam signal in the pulse missing portions in the crank signal and the duration of the different level before each of the portions, the CPU 11 uses the inverted value of the determination result of last time. As described above, when noise occurs in the cam signal and the cylinder determination cannot be made, the cylinder determination is continued by using the signal of last time. Consequently, without skipping ignition, injection, and the like, the control can be continuously performed.

(E) The periods of continuation of different levels (H level and L level) are measured based on the number of pulses (crank edges) in the crank signal. It is advantageous from a practical standpoint.

In the above embodiment, when noise occurs in the cylinder determination signal and the cylinder determination cannot be made, the inverted value of the determination result of last time is used as the result of determination of this time. Instead, the value of the angle counter may be read to make the cylinder determination.

Although the reference position in the crank signal is the pulse missing portion in the pulse train in the above description, the reference position is not limited to the pulse missing portion. The reference position in which the pulse interval is irregular can be also provided in a pulse train of predetermined angle interval in other configuration (such as a configuration in which a pulse is inserted to a pulse train).

The present invention may be implemented in other ways without departing from the spirit of the invention.

What is claimed is:

1. An engine control unit comprising:

a crank signal generating means for generating a crank signal comprising a pulse train and a series of reference positions, wherein the reference positions occur every 360° CA, and wherein each reference position corresponds to a rotation of a crankshaft of a four-cycle engine;

a cylinder determination signal generating means for generating a cylinder determination signal, wherein a level of the cylinder determination signal in a front reference position of every 720° CA is different than the level of the cylinder determination signal in a back reference position of every 720° CA, and wherein the level of the cylinder determination signal at an angle before each reference position is different from the level of the cylinder determination signal in each of the reference positions;

a pulse interval measuring means for measuring a pulse interval of the pulse train;

a frequency multiplication signal generating means for generating frequency multiplication signals an integer number of times during the pulse interval and for outputting a clock signal for engine control; and a determining means for determining the front reference position and the back reference position based on both the level of the cylinder determination signal in the reference positions and an amount of angle that the cylinder determination signal has a different level preceding the reference positions.

2. The engine control unit as in claim 1, wherein:

the frequency multiplication signal generating means is provided with a counter for generating a clock signal to be subjected to a counting operation based on the frequency multiplication signals; and an initializing means for initializing the counter in accordance with a determination result of the determining means.

3. An engine control unit comprising:

a crank signal generating means for generating a crank signal comprising a pulse train and a series of reference positions, wherein the reference positions occur every 360° CA, and wherein each reference position corresponds to a rotation of a crankshaft of a four-cycle engine;

a cylinder determination signal generating means for generating a cylinder determination signal, wherein a level of the cylinder determination signal in a front reference position of every 720° CA is different than the level of the cylinder determination signal in a back reference position of every 720° CA, and wherein the level of the cylinder determination signal at an angle before each reference position is different from the level of the cylinder determination signal in each of the reference positions;

a determining means for determining the front reference position and the back reference position based on both the level of the cylinder determination signal in the reference positions and an amount of angle that the cylinder determination signal has a different level preceding the reference positions;

a count means for executing a count operation in correspondence with the crank signal and for resetting a count value of the count means based on a determination result of the determining means; and a control means for controlling the engine based on the count value of the count means.

4. The engine control unit as in claim 1, further comprising:

a means for using an inverted value of an immediately preceding determination result of the determining means as a current determination result when the front reference position or back reference position cannot be determined by using the level of the cylinder determination signal in the reference position and the amount of angle that the cylinder determination signal has a different level preceding the reference position.

5. The engine control unit as in claim 1, wherein:

the reference positions are comprised of a pulse missing portion in the pulse train.

6. The engine control unit as in claim 1, wherein:

the amount of angle that the cylinder determination signal has a different level preceding the reference positions is measured based on the number of pulses in the crank signal.

7. An engine control unit comprising:

a crank signal generator for generating a crank signal comprising a pulse train and a series of reference positions, wherein the reference positions occur every 360° CA, and wherein each reference position corresponds to a rotation of a crankshaft of a four-cycle engine;

a cylinder determination signal generator for generating a cylinder determination signal, wherein a level of the cylinder determination signal in a front reference position of every 720° CA is different than the level of the cylinder determination signal in a back reference position of every 720° CA, and wherein the level of the cylinder determination signal at an angle before each reference position is different from the level of the cylinder determination signal in each of the reference positions;

a pulse interval measuring circuit for measuring a pulse interval of the pulse train;

a frequency multiplication signal generator for generating frequency multiplication signals an integer number of times during the pulse interval and for outputting a clock signal for engine control; and a determination circuit for determining the front reference position and the back reference position based on both the level of the cylinder determination signal in the reference positions and an amount of angle that the cylinder determination signal has a different level preceding the reference positions.

8. The engine control unit as in claim 7, wherein:

the frequency multiplication signal generator is provided with a counter for generating a clock signal to be subjected to a counting operation based on the frequency multiplication signals; and an initializer for initializing the counter in accordance with a determination result of the determination circuit.

9. An engine control unit comprising:

a crank signal generator for generating a crank signal comprising a pulse train and a series of reference positions, wherein the reference positions occur every 360° CA, and wherein each reference position corresponds to a rotation of a crankshaft of a four-cycle engine;

a cylinder determination signal generator for generating a cylinder determination signal, wherein a level of the cylinder determination signal in a front reference position of every 720° CA is different than the level of the cylinder determination signal in a back reference position of every 720° CA, and wherein the level of the cylinder determination signal at an angle before each reference position is different from the level of the cylinder determination signal in each of the reference positions;

a determination circuit for determining the front reference position and the back reference position based on both the level of the cylinder determination signal in the reference positions and an amount of angle that the cylinder determination signal has a different level preceding the reference positions;

a counter for executing a count operation in correspondence with the crank signal and for resetting a count value of the counter based on a determination result of the determination circuit; and a controller for controlling the engine based on the count value of the counter.

10. The engine control unit as in claim 7, further comprising:

a circuit for using an inverted value of an immediately preceding determination result of the determination circuit as a current determination result when the front reference position or back reference position cannot be determined by using the level of the cylinder determination signal in the reference position and the amount of angle that the cylinder determination signal has a different level preceding the reference position.

11. The engine control unit as in claim 7, wherein:

the reference positions are comprised of a pulse missing portion in the pulse train.

12. The engine control unit as in claim 7, wherein:

the amount of angle that the cylinder determination signal has a different level preceding the reference positions is measured based on the number of pulses in the crank signal.

13. The engine control unit as in claim 1, wherein the crank signal generating means is comprised of a crank angle sensor.

14. The engine control unit as in claim 1, wherein the cylinder determination signal generating means is comprised of a cam angle sensor.

15. The engine control unit as in claim 1, wherein the pulse interval measuring means is comprised of an edge time measuring counter.

16. The engine control unit as in claim 1, wherein the frequency multiplication signal generating means is comprised of a frequency multiplication counter.

17. The engine control unit as in claim 1, wherein the determining means is comprised of a microcomputer.

18. The engine control unit as in claim 1, wherein the determining means is comprised of a CPU.

19. An engine control unit comprising:
- a crank signal generator for generating a crank signal comprising a pulse train and a reference position;
- a cylinder determination signal generator for generating a cylinder determination signal, wherein the level of the cylinder determination signal at an angle before the reference position is different from the level of the cylinder determination signal in the reference position;
- a pulse interval measuring circuit for measuring a pulse interval of the pulse train;
- a frequency multiplication signal generator for generating frequency multiplication signals an integer number of times during the pulse interval and for outputting a clock signal for engine control; and
- a determination circuit for determining the reference position based on both the level of the cylinder determination signal in the reference position and an amount of angle that the cylinder determination signal has a different level preceding the reference position.

20. The engine control unit as in claim 19, further comprising:
- a circuit for using an inverted value of an immediately preceding determination result of the determination circuit as a current determination result when the reference position cannot be determined by using the level of the cylinder determination signal in the reference position and the amount of angle that the cylinder determination signal has a different level preceding the reference position.

21. The engine control unit as in claim 19, wherein:
the reference position is comprised of a pulse missing portion in the pulse train.

22. The engine control unit as in claim 19, wherein the determination circuit is comprised of a microcomputer.

23. The engine control unit as in claim 19, wherein the determination circuit is comprised of a CPU.

* * * * *